United States Patent [19]

Katayama et al.

[11] Patent Number: 5,187,703
[45] Date of Patent: Feb. 16, 1993

[54] MAGNETO-OPTICAL MULTILAYER RECORDING DISK AND METHOD OF REPRODUCING THE SAME

[75] Inventors: Hiroyuki Katayama, Nara; Junichiro Nakayama, Shiki; Kenji Ohta, Kita-Katsuragi; Toshio Ishikawa, Nara, all of Japan

[73] Assignee: Sharp Kabushiki Kaisha, Osaka, Japan

[21] Appl. No.: 660,375

[22] Filed: Feb. 25, 1991

[30] Foreign Application Priority Data

Feb. 28, 1990 [JP] Japan .................. 2-48709
Mar. 1, 1990 [JP] Japan .................. 2-50174

[51] Int. Cl.⁵ .............................. G11B 7/24
[52] U.S. Cl. .................. 369/275.1; 369/283; 369/288
[58] Field of Search ........... 369/275.1, 275.2, 275.3, 369/275.4, 275.5, 283, 286, 284, 288; 428/692, 694, 697, 900

[56] References Cited

U.S. PATENT DOCUMENTS

| | | | |
|---|---|---|---|
| 4,578,322 | 3/1986 | Sawamura et al. | 369/283 X |
| 4,866,672 | 9/1989 | Terao et al. | 369/288 |
| 4,889,757 | 12/1989 | Horigome et al. | 369/286 X |
| 4,902,584 | 2/1990 | Uchiyama et al. | 369/286 X |
| 5,058,099 | 10/1991 | Murakami et al. | 369/288 |
| 5,063,092 | 11/1991 | Hirota et al. | 369/288 |

FOREIGN PATENT DOCUMENTS

| | | | |
|---|---|---|---|
| 0349271 | 1/1990 | European Pat. Off. | 369/283 |
| 59-215037 | 12/1984 | Japan | 369/13 |
| 59-215044 | 12/1984 | Japan | 369/286 |
| 62-73442 | 4/1987 | Japan . | |
| 63-291277 | 11/1988 | Japan | 369/275.3 |
| 1-158645 | 6/1989 | Japan | 369/283 |
| 0108257 | 4/1990 | Japan | 369/286 |
| 2-214047 | 8/1990 | Japan | 369/286 |

OTHER PUBLICATIONS

Y. Murakami et al., "A Magneto-Optical Disk for Readout Using Circular Dichroism Effect", IEEE Trans. Journal on Magnetics in Japan vol. 5, No. 4, Apr. 1990.
"A Magneto-Optical Disk for Readout Using Circular Dichroism Effect", Japanese Applied Magnetic Association, vol. 13, No. 2, 1989 pp. 195-198.

Primary Examiner—Eugene R. LaRoche
Assistant Examiner—Tan Nguyen
Attorney, Agent, or Firm—David G. Conlin; Robert F. O'Connell

[57] ABSTRACT

A magneto-optical disk is provided with a transparent substrate of a disk shape, and a multiple layered structure which is formed on the substrate and includes a plurality of transparent dielectric films and magnetic recording films which are alternatively layered. One method of reproducing the magneto-optical disk is enabled, which has the steps of inputting a circularly or elliptically polarized light on the magneto-optical disk, and detecting an intensity change of the light caused by the magneto-optical disk due to the circular dichroism effect thereof, as a reproduced signal. Another method of reproducing the magneto-optical disk is also enabled, which has the steps of inputting a linearly polarized light on the magneto-optical disk, and detecting a rotation change of a polarization plane of the light caused by the magneto-optical disk due to the magnetic Kerr effect, as a reproduced signal.

10 Claims, 4 Drawing Sheets

LIGHT BEAM (780nm)

Fig. 7

MAGNETO-OPTICAL MULTILAYER RECORDING DISK AND METHOD OF REPRODUCING THE SAME

BACKGROUND OF THE INVENTION

1. Field of the Invention

The present invention relates to a magneto-optical disk and a method of reproducing the data recorded on the same.

2. Description of the Related Art

An optical disk, in which data can be optically recorded and reproduced by use of a light beam such as a laser beam, is quite useful and advantageous as one of large capacity and high density recording media for digital data.

There are various types of optical disks. One type is so called a read only memory (ROM) type optical disk, such as a CD-ROM (compact disk ROM), in which the data can be only read by the ROM type reproducing apparatus, such as a CD player, at the user side. Another type is so called a write once read many (WORM) type, in which the data can be written only once and can be read many times by the WORM type reproducing apparatus at the user side.

Such an optical disk of ROM or WORM type etc. is provided with a thin transparent substrate of a disk shape. The digital signal is recorded on the optical disk in a form of the row of pits in a physical concave/convex manner in a size of micron order. The pits are formed on a predetermined track in a recording layer of the optical disk, with a pitch of about 1.6 μm in a spiral shape, by irradiating a light beam which is controlled to form a focused light spot at a prescribed position on the track, for example.

In the ROM or WORM type optical disk reproducing apparatus, a reproducing light beam is controlled by a focusing servo-mechanism and a tracking servo-mechanism etc., so as to be focused on the row of pits with a spot diameter not greater than 1 μm, for example.

Accordingly, by detecting the light intensity of the reflected light from the disk, which depends on the existence of the pits, the digital data on the ROM or WORM type optical disk can be reproduced.

Especially, in such a reproducing operation, the light beam is irradiated to the pits through the transparent substrate. Accordingly, since the diameter of the light beam at the surface of the substrate is relatively large compared with the diameter of the focused light spot at the pits, the undesirable effect of a dust or scratch on the surface of the substrate is effectively reduced.

As another kind of the optical disk, there is a magneto-optical disk, in which the data recording operation is performed by turning the direction of the magnetization of the magnetic film with the perpendicular magnetic anisotropy formed on a transparent substrate. This magneto-optical disk is provided with a recording film made of a rare earth transition metal alloys, for example. Such a magneto-optical disk is useful and advantageous since the content of the recorded data can be changed in many times at the user side.

Reproducing the data on such a magneto-optical disk is performed by a magneto-optical disk recording/reproducing apparatus by use of the magneto-optical Kerr effect or the Faraday effect.

Namely, when a linearly polarized light beam is incident on the magnetic film with the perpendicular magnetic anisotropy, the polarization plane of the reflected light or the transmitted light is rotated by a certain degrees with respect to the direction of the polarization plane of the incident light.

Accordingly, by detecting such a rotation of the polarization plane, which depends on the direction of the magnetization of the recording film, the digital data on the magneto-optical disk can be reproduced.

As described above, the magneto-optical disk can not be reproduced by the ROM or WORM type reproducing apparatus, since the detection object of the magneto-optical disk is the above mentioned rotation of the polarization plane enhanced by the Kerr effect or Faraday effect, while the detection object of the ROM or WORM type optical disk is simply the light intensity of the reflected light.

That is to say, the magneto-optical disk can be only reproduced in the presence of an exclusive magneto-optical disk reproducing apparatus, having no compatibility with the aforementioned ROM or WORM type optical disk reproducing apparatuses. This is a great disadvantage since the ROM or WORM type optical disk reproducing apparatuses are quite useful and can be well popularized in the users.

In addition, since such an exclusive magneto-optical disk reproducing apparatus deals with the linearly polarized light beam, a relatively large number of optical components are required, while the accuracy in the optical arrangement thereof is also critically requested, resulting in an increase of the total cost and size of the apparatus.

By the way, as for such a kind of magneto-optical disk, a signal detecting method can be also theoretically effected by use of the circular dichroism effect of a magnetic material. The circular dichroism effect is such an effect that the intensity and phase of the light is changed due to the direction of the magnetization of the magnetic material when a circularly polarized light beam is incident on the magnetic material.

It is reported in the Japanese Applied Magnetic Academy Report, 12, 1988, one example of such a detecting method using circular dichroism effect, in which a garnet film is utilized as a recording film and a differential signal at a bit boundary is detected. However, the circular dichroism effect by this reported method is very small especially in case of making a recording film from the rare earth transition metal alloys, so that it is very difficult to detect the corresponding signal. Accordingly, this method can hardly be put into practical use.

SUMMARY OF THE INVENTION

It is therefore a first object of the present invention to provide a magneto-optical disk which can be easily reproduced.

It is a second object of the present invention to provide a method of reproducing the magneto-optical disk of the present invention.

According to the present invention, the first object can be achieved by a first magneto-optical disk. The first magneto-optical disk is provided with a transparent substrate of a disk shape, and a multiple layered structure which is formed on the transparent substrate and includes a plurality of transparent dielectric films and magnetic recording films which are alternatively layered.

According to the present invention, the first object can be also achieved by a second magneto-optical disk.

The second magneto-optical disk is provided with a transparent substrate of a disk shape, a first transparent dielectric film formed on the transparent substrate, a recording film with the perpendicular magnetic anisotropy formed on the first transparent dielectric film, a second transparent dielectric film formed on the recording film with the perpendicular magnetic anisotropy, and a reflection film formed on the second transparent dielectric film.

According to the present invention, the second object can be achieved by a first method of reproducing the above mentioned first and second magneto-optical disks. The first reproducing method has the steps of inputting a circularly or elliptically polarized light on the magneto-optical disk, and detecting an intensity change of the light caused by the magneto-optical disk due to the circular dichroism effect thereof, as a reproduced signal.

According to the present invention, the second object can be also achieved by a second method of reproducing the above mentioned first and second magneto-optical disks. The second reproducing method has the steps of inputting a linearly polarized light on the magneto-optical disk, and detecting a rotation change of a polarization plane of the light caused by the magneto-optical disk due to the magnetic Kerr effect, as a reproduced signal.

In the first magneto-optical disk, the information signal can be recorded as the direction change of the magnetization in the magnetic recording films.

According to the first reproducing method, one method of reproducing the first magneto-optical disk thus recorded can be enabled by inputting a circularly polarized light or an elliptically polarized light, with a relatively large ellipticity for example, to the magneto-optical disk as a reproducing light.

At this time, since the transparent dielectric films and the magnetic recording films are alternatively layerd in the multiple layered structure, the circular dichroism effect is enhanced by the multiple layered structure. Accordingly, the intensity of the reflected light or transmitted light of the magneto-optical disk is changed according to the direction change of the magnetization i.e. the information signal recorded in the magnetic recording films. Thus, just by detecting the light intensity of the reflected or transmitted light, the information signal can be reproduced, in a same manner as the ROM or WORM type optical disk reproducing apparatus.

According to the second reproducing method, another method of reproducing the first magneto-optical disk thus recorded can be also enabled by inputting a linearly polarized light to the magneto-optical disk as a reproducing light.

At this time, since the transparent dielectric films and the magnetic recording films are alternatively layered in the multiple layered structure, the magnetic Kerr effect is enhanced by the multiple layered structure. Accordingly, the rotation of the polarization plane of the reflected light or transmitted light of the magneto-optical disk is changed according to the direction change of the magnetization i.e. the information signal recorded in the magnetic recording films. Thus, by detecting the rotation of the polarization plane of the reflected or transmitted light, the information signal can be reproduced, by a magneto-optical disk reproducing apparatus.

As described above, the first magneto-optical disk can be easily reproduced.

In the second magneto-optical disk, the information signal can be recorded as the direction change of the magnetization in the magnetic recording films.

According to the first reproducing method, one method of reproducing the second magneto-optical disk thus recorded can be enabled by inputting a circularly polarized light or an elliptically polarized light, with a relatively large ellipticity for example, to the magneto-optical disk as a reproducing light.

At this time, since the first transparent dielectric film, the recording film with the perpendicular magnetic anisotropy, the second transparent dielectric film are formed on the transparent subtarate in the multiple layered structure, the circular dichroism effect is enhanced by the multiple layered structure. Accordingly, just in a same manner as the above mentioned first magneto-optical disk of the present invention, the second magneto-optical disk can be reproduced.

According to the second reproducing method, another method of reproducing the second magneto-optical disk thus recorded can be also enabled by inputting a linearly polarized light to the magneto-optical disk as a reproducing light.

At this time, since the first transparent dielectric film, the recording film with the perpendicular magnetic anisotropy, the second transparent dielectric film are formed on the transparent substrate in the multiple layered structure, the magnetic Kerr effect is enhanced by the multiple layered structure. Accordingly, just in a same manner as the above mentioned first magneto-optical disk of the present invention, the second magneto-optical disk can be reproduced by the second reproducing method of the present invention.

Further objects and advantages of the present invention will be apparent from the following description of the preferred embodiment of the invention as illustrated in the accompanying drawings.

DETAILED DESCRIPTION OF THE PREFERRED EMBODIMENT

A preferred embodiment of the present invention will be described below with reference to the accompanying drawings.

Figure 1:
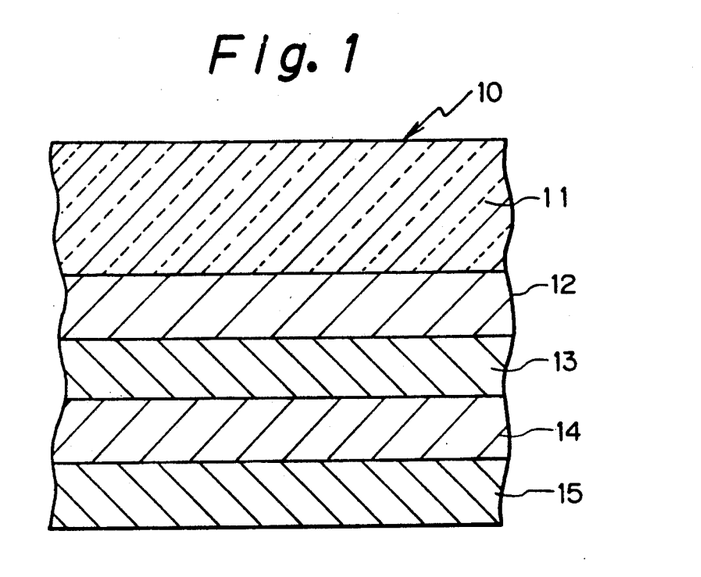
FIG. 1 is a partial cross sectional view showing a structure of a magneto-optical disk as a first embodiment of the present invention.

FIG. 1 shows a magneto-optical disk of a first embodiment according to the present invention.

In FIG. 1, a magneto-optical disk 10 includes a transparent protection substrate 11. A first nitride film 12 as a first transparent dielectric film, a magnetic film with the perpendicular anisotropy 13, a second nitride film 14 as a second transparent dielectric film, and a reflection film 15 are successively layered on the substrate 11 in this order, to form a multiple layered structure of the magneto-optical disk 10.

The substrate 11 is made of a glass substrate with a thickness of 1.2 mm, for example. As a material of the substrate 11, PC (polycarbonate), PMMA (polymethyl methacrylate) or APO (amorphous polyolefin) may be utilized instead of the above mentioned glass.

Each of the nitride film 12 and nitride film 14 is made from AlN (aluminum nitride) with a film thickness of 50 nm which has a refractive index of 2.05, for example.

The film 13 is made from TbFeCo (terbium iron cobalt) with a film thickness of 20 nm, which has a refractive index of $[(3.20-3.55i)\pm(0.05-0.03i)]$ with respect to a reproducing light wavelength of 780 nm, and a refractive index of $[(2.5-2.4i)\pm(0.008-0.025i)]$ with respect to a reproducing light wavelength ($\lambda$) of 390 nm, where i represents the imaginary part, and the sign of the refractive index is plus when the magnetization is directed upward, and minus when it is directed downward.

As a material of the magnetic film 13, rare earth transition metal alloys such as GdTbFe (gadolinium terbium iron) and DyFeCo (dysprosium iron cobalt), MnBi (manganese bismuth), MnBiCu (manganese bismuth copper), Bi substitution garnet, oxide magnetic bodies of Co ferrite, PtMnSb (platinum manganese antimony), Pt/Co or Pd/Co, may be utilized instead of the above mentioned TbFeCo.

The reflection film 15 is composed of an Al layer with a thickness of 50 nm, which has a refractive index of (2–7i) with respect to the reproducing light wavelength of 780 nm, and a refractive index of (0.78–2.2i) with respect to the reproducing light wavelength of 390 nm.

As a material of the reflection film 15, Au (gold), Ag (silver), Cu, Ni (nickel) or Pt may be utilized instead of the above mentioned Al.

As a material of the nitride films 12 and 14, SiN (silicon nitride), ZnS (zinc sulfide), SiAlON (silicon aluminum oxide nitride), AlNGe (aluminum nitride germanium) or SiO (silicon oxide) may be utilized instead of the above mentioned AlN.

The magneto-optical disk 10 thus constructed, enhances the circular dichroism effect and the magneto-optical Kerr effect depending on the wavelength of the incident reproducing light, because of its multiple layered structure.

Hereinbelow, the calculation results of the magneto-optical Kerr rotation angle $\theta k$ and the ellipticity $\epsilon$ by means of simulation will be explained, as for the first example in which the nitride film 14 is made of AlN with the refractive index of 2.05 where the film thickness thereof is varied from 0 to 200 nm, with referring to FIGS. 2 and 3, respectively.

Figure 2:
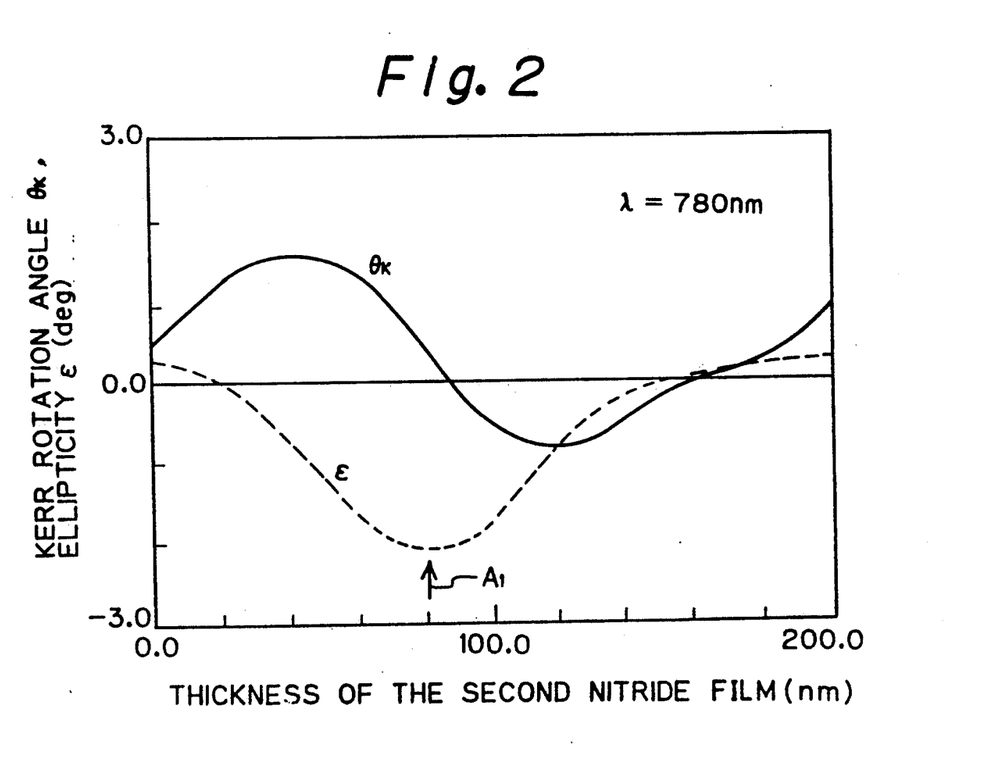
FIG. 2 is a graph showing the characteristic curves of the Kerr rotation angle and the ellipticity in the first example of the first embodiment of FIG. 1.
Figure 3:
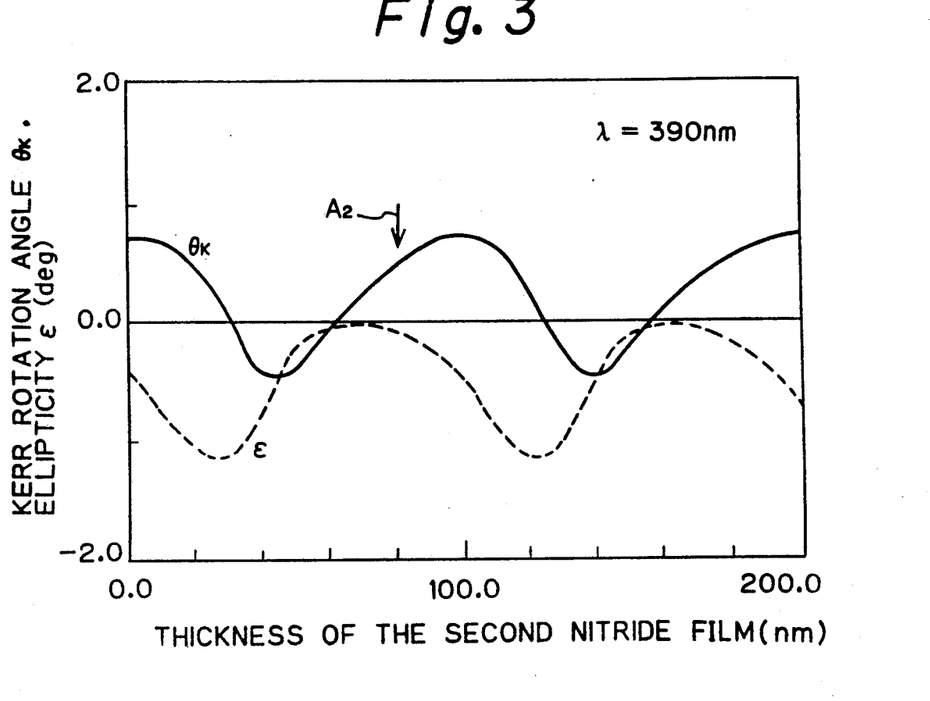
FIG. 3 is a graph showing characteristic curves of the Kerr rotation angle and the ellipticity in another example of the first embodiment of FIG. 1.

FIG. 2 shows the calculation results with respect to the reproducing light wavelength of 780 nm, while FIG. 3 shows the same with respect to the reproducing light wavelength of 390 nm.

In FIGS. 2 and 3, the ellipticity $\epsilon$ is a value determined by the complex reflecting index depending on the direction of the magnetization recorded on the magnetic film 13. This is because the thickness of the nitride film 14 affects the magnitude of the Kerr effect much more than thicknesses of other films. The calculation is made with referring to the method of A. E. Bell (IEEE, QE-14(7), 1978).

As shown in FIG. 2, by setting the thickness of the nitride film 14 about 80 nm as indicated by an arrow A1, the ellipticity $\epsilon$ can be made to be about 2.1 degrees with respect to the wavelength of 780 nm.

On the other hand as shown in FIG. 3, by setting the thickness of the nitride film 14 about 80 nm as indicated by an arrow A2, the Kerr rotation angle $\theta k$ can be made to be about 0.44 degrees with repsect to the wavelength of 390 nm.

Accordingly, in this first example, on one hand, the Kerr rotation angle $\theta k$ can be made to be about 2.6 times as large as that of a single layer structure of TbFeCo (in which the ellipticity $\epsilon$ is about 0.14 degrees with respect to the wavelength of 780 nm, while the Kerr rotation angle $\theta k$ is about 0.17 degrees with respect to the wavelength of 390 nm). On the other hand, the ellipticity $\epsilon$ can be made to be about 4.8 times as large as that of the above mentioned single layer structure of TbFeCo. That is to say, the circular dichroism effect can be enhanced as the ellipticity $\epsilon$ is made large, while the Kerr effect can be enhanced as the Kerr rotation angle $\theta k$ is made large, due to the multiple layered structure of this first example.

As described above, by forming the magneto-optical disk 10 having the multiple layer structure with the film thicknesses as the above described first example, the bit pattern recorded on the magnetic film 13 by use of the light beam with the wavelength of 390 nm, can be reproduced by the detection of the reflected light intensity, i.e. by the ROM or WORM type optical disk reproducing apparatus, such as a CD player for example, which uses the reproducing light beam with the wavelength of 780 nm.

As a second example of the present embodiment, the thicknesses of the nitride film 12, the magnetic film 13, the nitride film 14 and the reflection film 15 are set to 80 nm, 20 nm, 20 nm and 50 nm respectively in the above mentioned multiple layered structure of the present embodiment.

In this second example, the ellipticity $\epsilon$ can be made to be 0.61 degrees with respect to the wavelength of 390 nm, while the Kerr rotation angle $\theta k$ can be made to be 1.3 degrees with respect to the wavelength of 780 nm.

In this second example, on one hand, the Kerr rotation angle $\theta k$ can be made to be about 3.0 times as large as that of a single layer structure of TbFeCo (in which the ellipticity $\epsilon$ is about 0.34 degrees with respect to the wavelength of 390 nm, while the Kerr rotation angle $\theta k$ is about 0.43 degrees with respect to the wavelength of 780 nm). On the other hand, the ellipticy in this second example can be made to be about 1.8 times as large as that of the above mentioned single layer structure of TbFeCo. That is to say, the circular dichroism effect can be enhanced as the ellipticity $\epsilon$ is made large, while the Kerr effect can be enhanced as the Kerr rotation angle $\theta k$ is made large, due to the multiple layered structure of this second example.

As described above, by forming the magneto-optical disk 10 in the multiple layered structure with the film thicknesses as the above mentioned second example, the bit pattern recorded on the magnetic film 13 by a magneto-optical disk recording/reproducing apparatus using the light beam with the wavelength of 780 nm, can be reproduced by the detection of the reflected light intensity, i.e. by the ROM or WORM type optical disk reproducing apparatus, which uses the reproducing light beam with the wavelength of 390 nm.

The above mentioned reproducing light with the wavelength of 780 nm is, for example, generated by a semiconductor laser source with 40 mW output power, while the reproducing light with the wavelength of 390 nm is, for example, generated by SHG (Second Harmonic Generator) with 3 mW output power.

By the way, as for the wavelength of the reproducing light, it is not limited to the above mentioned 780 nm or 390 nm, in which such a relationship is achieved that one wavelength is a half of the other wavelength. Many different kinds of wavelengths $\lambda$ can be utilized by different types of the light sources.

Figure 4:
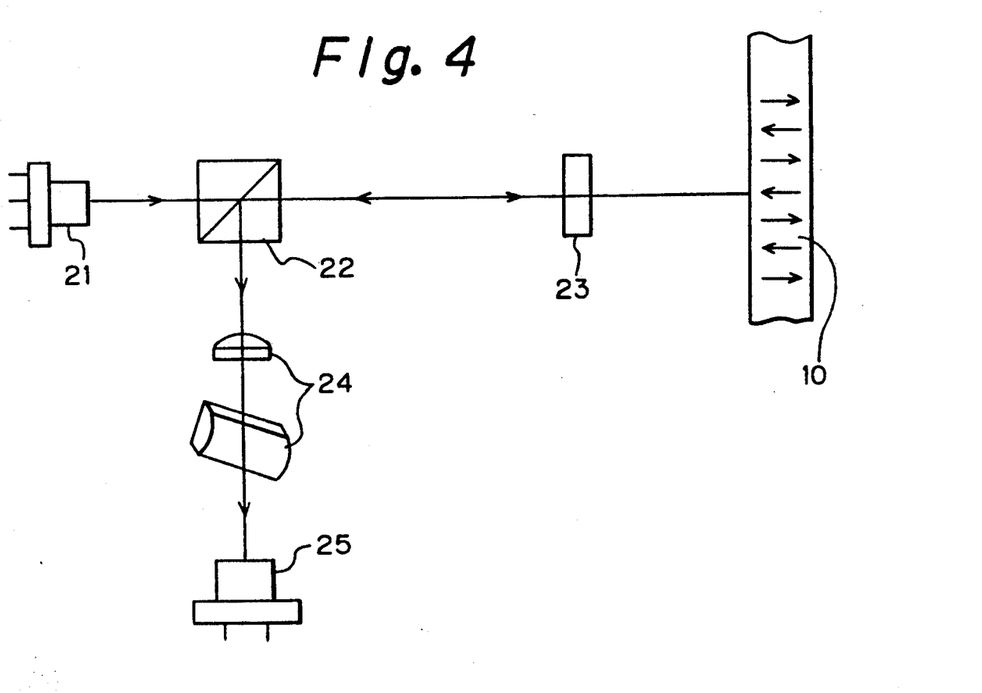
FIG. 4 is a schematic constructional view showing an optical system for reproducing the magneto-optical disk of FIG. 1.

FIG. 4 shows the construction of the optical system used in the reproducing operation of the magneto-optical disk 10. In this reproducing optical system, the circular dichroism effect is used for the detection. That is to say, this optical system is constructed as a ROM type optical disk reproducing apparatus such as the CD player or VD (video disk) player, in which the circularly or elliptically polarized light beam is inputted and the recorded information is detected as the reflected light intensity.

In FIG. 4, the optical system includes a semiconductor laser source 21. The laser source 21 emits a linearly polarized light beam as a reproducing light beam.

The optical system also includes a beam splitter 22 and a $\lambda/4$ plate 23. The reproducing light beam is transmitted through the beam splitter 22 and the plate 23. At the plate 23, the light beam is changed to a circularly polarized or elliptical light beam. Then, the light beam is irradiated on the magneto-optical disk 10, where it is reflected toward a light detector 25 through the plate 23, the beam splitter 22 and lenses 24.

When the reflected light beam is transmitted through the plate 23, it becomes a linearly polarized light beam which polarization plane is rotated by 90 degrees. Thus, the reflected light beam is reflected by the beam splitter 22 and directed toward the detector 25.

At this time, the reflected light intensity corresponds to the information recorded on the magneto-optical disk 10 i.e. the direction of the magnetization of the magnetic film 13 because the circular dichroism effect is enhanced by the magneto-optical disk 10. So, the reflected light intensity is detected and changed to an electrical signal as the reproduced data, at the light detector 25.

As described above, the optical system of the present embodiment can be made in a simple form, compared with an optical system by use of the Kerr effect, except the arrangement of the plate 23 for obtaining the circular polarization. Thus, the optical system and the disk driving apparatus for reproducing the magneto-optical disk by use of the circular dichroism effect for the magneto-optical signal detection as the present embodiment, can be constructed in a compact form with a reduced weight, compared with the optical system by use of the Kerr effect.

Figure 5:
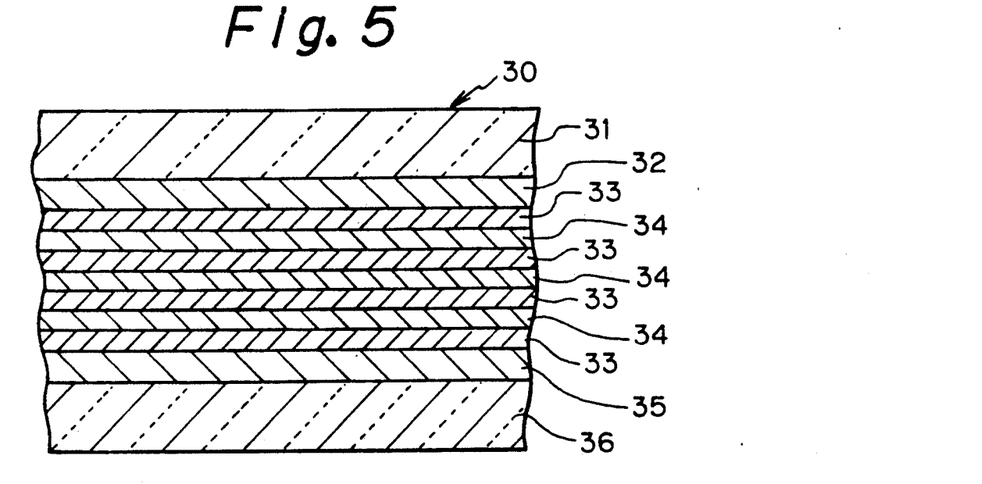
FIG. 5 is a partial cross sectional view showing a structure of a magneto-optical disk as a second embodiment of the present invention.

FIG. 5 shows a magneto-optical disk of a second embodiment according to the present invention.

In FIG. 5, a magneto-optical disk 30 includes a transparent protection substrates 31 and 36. On the lower surface of the substrate 31, there is formed a AlN film 32. On the upper surface of the substrate 36, there is formed a AlN film 35. Between the films 32 and 35, there are formed recording films 33 and AlN films 34 alternatively and successively, to form a multiple layered structure of the magneto-optical disk 30.

Each of the films 32, 34 and 35 is composed of a transparent dielectric film. As a material of these films 32, 34 and 35, SiN, ZnS, SiAlON, AlNGe or SiO may be utilized instead of the above mentioned AlN.

The AlN film 32 has a refractive index of 2.05, for example, and a thickness of 100 nm. Each of the films 34 has a refractive index of 2.05, for example, and a thickness of 0.5 nm. The film 35 has a refractive index of 2.05, for example, and a thickness of 75 nm.

Each of the films 33 is made from TbFeCo with a thickness of 0.5 nm, which has a refractive index of $[(3.20-3.55i) \pm (0.05-0.03i)]$ with respect to a reproducing light wavelength ($\lambda$) of 780 nm, where i represents the imaginary part, and the sign of the refractive index is plus when the magnetization is directed upward, and minus when it is directed downward.

As a material of the recording films 33, rare earth transition metal alloys such as GdTbFe and DyFeCo, MnBi, Bi substitution garnet, oxide magnetic bodies of Co ferrite, PtMnSb, Pt/Co or Pd/Co, may be utilized instead of the above mentioned TbFeCo.

Each of the substrates 31 and 36 is made of a glass substrate. As a material of the substrates 31 and 36, PC, PMMA or APO may be utilized instead of the above mentioned glass.

The magneto-optical disk 30 thus constructed, enhances the circular dichroism effect and the magnetic Kerr effect when a reproducing light beam is incedent thereto, due to its multiple layered structure.

Figure 6:
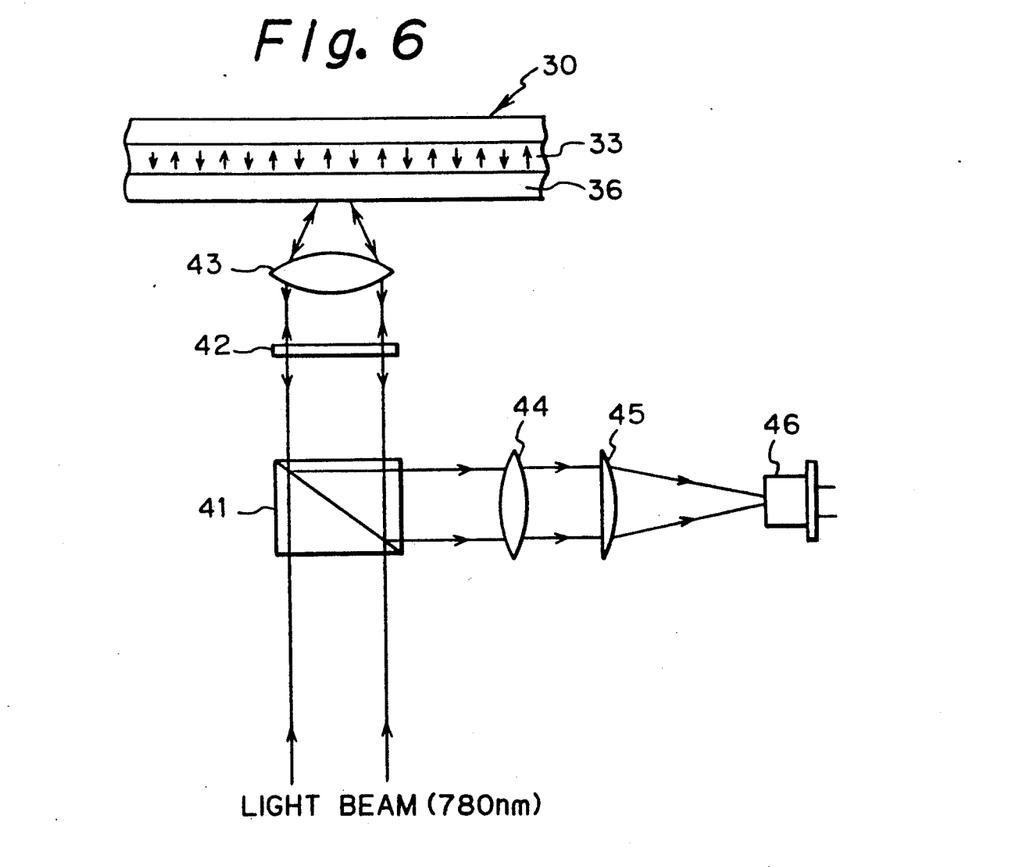
FIG. 6 is a schematic constructional view showing an optical system for reproducing the magneto-optical disk of FIG. 5.

FIG. 6 shows the construction of the optical system used in the reproducing operation of the magneto-optical disk 30. This optical system is constructed as a ROM or WORM type optical disk reproducing apparatus, in which the circularly or elliptically polarized light beam is incident on the magneto-optical disk 30 and the recorded information is detected as the intensity variations of the reflected light.

In FIG. 6, the optical system includes a beam splitter 41, a $\lambda/4$ plate 42 and an objective lens 43. The reproducing light beam of a linearly polarized type with a wavelength 780 nm from a light source (not shown) such as a semiconductor laser source is introduced to the beam splitter 41.

The light beam is transmitted through the beam splitter 41 and the plate 42. At the plate 42, the light beam is changed to a circularly or elliptically polarized light beam. Then, the light beam is irradiated through the lens 43 on the magneto-optical disk 30 from the side of the substrate 36. Then, the light is reflected from the recording films 33 and introduced to the beam splitter 41 through the lens 43 and the plate 42.

When the reflected light beam is transmitted through the plate 42, it becomes a linearly polarized light beam which polarization plane is rotated by 90 degrees. Thus, the reflected light beam is reflected by the beam splitter 41 and directed toward the light detector 46 through a condensor lens 44 and a cylindrical lens 45.

At this time, the reflected light intensity corresponds to the information recorded on the magneto-optical disk 30 i.e. the direction of the magnetization of the recording films 33 because the circular dichroism effect is enhanced by the magneto-optical disk 30. So the reflected light intensity is detected and changed to an electrical signal as the reproduced data, at the light detector 46.

As described above, the optical system of the present embodiment can be made in a simple form, compared with an optical system by use of the Kerr effect, except the arrangement of the plate 42 for obtaining the circular polarization. Thus, the optical system by use of the circular dichroism effect for the magneto-optical signal detection as the present embodiment, can be constructed in a compact form with a reduced weight.

Hereinbelow, the calculation results of the ellipticity $\epsilon$ by means of simulation will be explained as for the magneto-optical disk 30.

The ellipticity $\epsilon$ is a value determined by the complex refraction index depending on the directional difference of the magnetization recorded on the recording films 33. The calculation is made with referring to the method of A. E. Bell.

With respect to the light beam with the wave length 780 nm as shown in FIG. 6, the ellipticity $\epsilon$ can be made to be about 0.85 degrees. This value of the ellipticity $\epsilon$ is about 6.1 times as large as that of a single layer structure of TbFeCo (in which the ellipticity $\epsilon$ is about 0.14 degrees with respect to the wavelength of 780 nm). That is to say, the circular dichroism effect can be enhanced as the the ellipticity $\epsilon$ is made large due to the multiple layer structure of the present embodiment.

As described above, by forming the magneto-optical disk 30 in the multiple layer structure with the aforementioned film thicknesses, the bit pattern, which is magneto-optically recorded on the magneto-optical disk 30, can be reproduced by a ROM type optical disk reproducing apparatus such as a CD player, by use of the reproducing light beam with the wavelength of 780 nm which enhances the circular dichroism effect.

Figure 7:
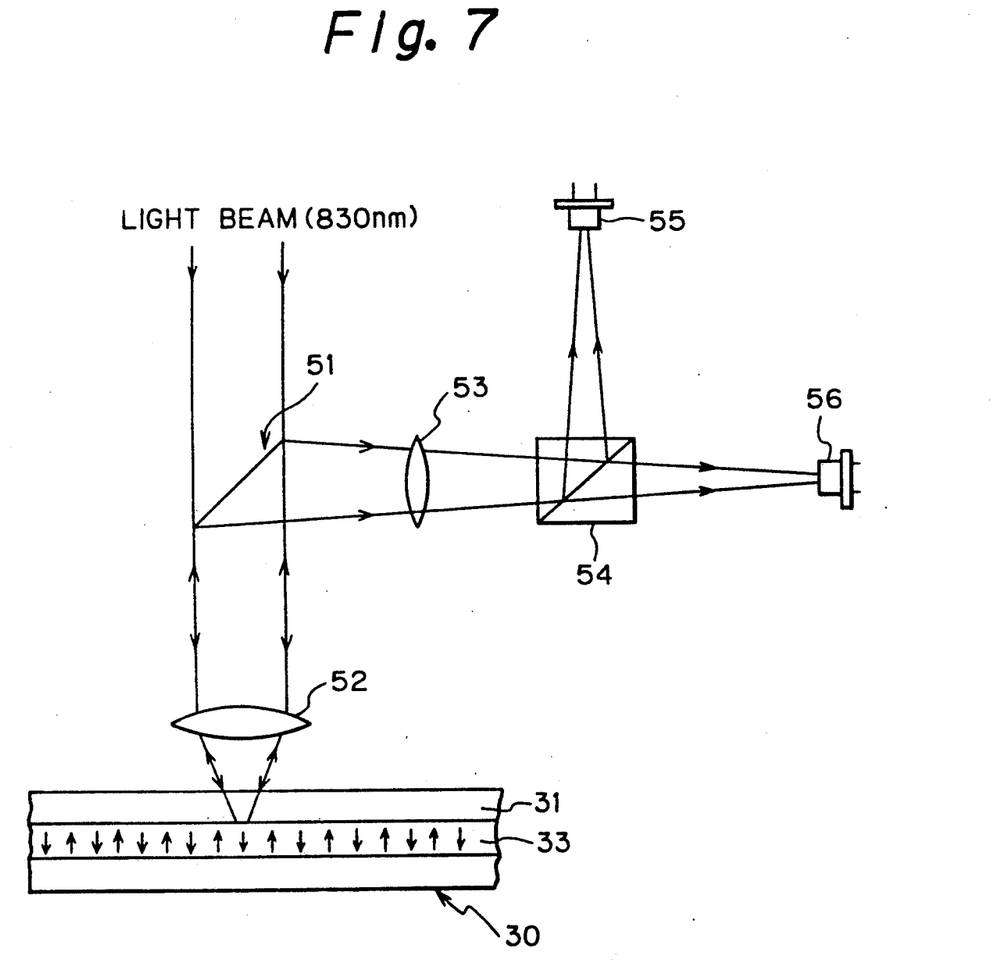
FIG. 7 is a schematic constructional view showing another optical system for reproducing the magneto-optical disk of FIG. 5.

FIG. 7 shows another construction of the optical system used in the reproducing operation of the magneto-optical disk 30. This optical system is constructed as a magneto-optical disk reproducing apparatus, in which the linearly polarized light beam is incident on the magneto-optical disk 30 and the recorded information is detected as the rotation of the polarization plane of the reflected light.

In FIG. 7, the optical system includes a half mirror 51, an objective lens 52, a condensor lens 53 and a beam splitter 54. The reproducing light beam of a linearly polarized type with a wavelength 830 nm from a light source (not shown) such as a semiconductor laser source, is irradiated on the magneto-optical disk 30 from the side of the substrate 31. Then, the light is reflected from the recording films 33 and introduced to the mirror 51 through the objective lens 52. Then the reflected light beam is reflected at the half mirror 51 and directed toward the beam splitter 54 through the condensor lens 53.

At the beam splitter 54, the reflected light beam is divided into P polarization component and S polarization component.

At this time, the rotation of the polarization plane of the reflected light corresponds to the information recorded on the magneto-optical disk 30 i.e. the direction of the magnetization of the recording films 33 because the magneto-optical Kerr effect is enhanced by the magneto-optical disk 30. So each of the P polarization component and S polarization component is detected by each of light detectors 55 and 56. The light intensity of the P component is changed to an electrical signal at the light detector 55, while the light intensity of the S component is changed to an electrical signal at the light detector 56. Then, the difference between the output signals from the light detectors 55 and 56 is amplified as the reproduced data. As described above, the magneto-optical disk 30 can be reproduced by a magneto-optical disk reproducing apparatus by use of the magnetic Kerr effect.

Hereinbelow, the calculation results of the magnetic Kerr rotation angle $\theta k$ by means of simulation will be explained, as for the magneto-optical disk 30. The calicuation is made with referring to the method of A. E. Bell.

With respect to the light beam with the wave length ($\lambda$) of 830 nm as shown in FIG. 7, the Kerr rotation angle $\theta k$ can be made to be about 1.13 degrees. This value of the Kerr rotation angle $\theta k$ is about 2.6 times as large as that of a single layer structure of TbFeCo. (in which the Kerr rotation angle $\theta k$ is about 0.43 degrees with respect to the wavelength of 830 nm). That is to say, the Kerr effect can be enhanced as the Kerr rotation angle $\theta k$ is made large due to the multiple layer structure of the present embodiment.

As described above, by forming the magneto-optical disk 30 in the multiple layer structure with the aforementioned film thicknesses, the bit pattern, which is recorded on the recording films 33 by a magneto-optical disk recording/reproducing apparatus, can be reproduced by the magneto-optical disk reproducing apparatus by use of the reproducing light beam with the wavelength of 830 nm.

By the way, as for the wavelength of the reproducing light, it is not limited to the above mentioned 780 nm or 830 nm. Many different kinds of wavelengths $\lambda$ can be utilized by different types of the light sources, for recording and reproducing. Especially, for recording and for reproducing, light beams of same wavelength may be used, or light beams of different wavelength may be used.

In the above described construction of the second embodiment, the magneto-optical disk 30 has two substrates 31 and 36. However, the magneto-optical disk can be constructed to have only one substrate with a transparent protection coating film in place of the other substrate, which may be made of ultraviolet hardening polymer, for example.

The number of the recording films 33 can be increased or decreased, and the thickness of the film 33 and other films can be also changed, where the thickness of the recording films 33 may be either constant or variable.

In the above described embodiments, the reflected light is detected for the signal detection, but the transmitted light through the magneto-optical disk may be detected instead of the reflected light.

Many widely different embodiments of the present invention may be constructed without departing from the spirit and scope of the present invention. It should be understood that the present invention is not limited to the specific embodiments described in this specification, except as defined in the appended claims.

What is claimed is:

1. A magneto-optical recording disk, which is reproduced by two kinds of reproducing lights each having predetermined wavelength different from each other comprising:

a transparent substrate of a disk shape; and
a multiple layered structure formed on said transparent substrate, said multiple layered structure including a plurality of transparent dielectric films and a plurality of magnetic recording films,
said transparent dielectric films and said magnetic recording films being alternately layered, said multiple layered structure being so constructed that a circular dichroism effect of said multiple layered structure is enhanced with respect to one kind of said reproducing lights and a magnetic Kerr effect of said multiple layered structure is enhanced with respect to the other kind of said reproducing lights, each of refractive indexes and thicknesses of said transparent dielectric films and said magnetic recording films being prescribed as a function of said predetermined wavelengths.

2. A magneto-optical recording disk, according to claim 1, further comprising another transparent substrate of a disk shape such that said multiple layered structure is disposed between said transparent substrates.

3. A magneto-optical recording disk according to claim 1, wherein said multiple layered structure is adapted to change an intensity of a circularly polarized light or an intensity of an elliptically polarized light, said circularly polarized light or said elliptically polarized light being inputted as said one kind of said reproducing lights from one side of said magneto-optical recording disk by said circular dichroism effect, said multiple layered structure being further adapted to change a rotation of a polarization plane of a linearly polarized light which is inputted as the other kind of said reproducing lights from the other side of said magneto-optical recording disk by said magnetic Kerr effect.

4. A method of reproducing signals recorded on a magneto-optical recording disk, said magneto-optical recording disk being claimed in claim 1, comprising the steps of:
inputting a circularly or elliptically polarized light on said magneto-optical recording disk as said one kind of said reproducing lights; and
detecting an intensity change of said light caused by said magneto-optical recording disk due to said circular dichroism effect thereof as a reproduced signal.

5. A method according to claim 4, wherein said method is performed by any one of a ROM type optical recording disk reproducing apparatus and A WORM type optical recording disk reproducing apparatus.

6. A method of reproducing signals recorded on a magneto-optical recording disk, said magneto-optical recording disk being claimed in claim 1, comprising the steps of:
inputting a linearly polarized light on said magneto-optical recording disk as said one kind of said reproducing lights; and
detecting a rotation change of a polarization plane of said light caused by said magneto-optical recording disk due to said magnetic Kerr effect as a reproduced signal.

7. A magneto-optical recording disk, which is reproduced by two kinds of reproducing lights each having a predetermined wavelength different from each other comprising:
a transparent substrate of a disk shape;
a first transparent dielectric film formed on said transparent substrate;
a recording film with a perpendicular magnetic anisotropy formed on said first transparent dielectric film, said recording film with said perpendicular magnetic anisotropy being adapted to be responsive to said two kinds of reproducing lights;
a second transparent dielectric film formed on said recording film with said perpendicular magnetic anisotropy; and
a reflection film formed on said second transparent dielectric film,
said first transparent dielectric film, said second transparent dielectric film, and said recording film with said perpendicular magnetic anisotropy being so constructed that a circular dichroism effect of said magneto-optical recording disk is enhanced with respect to one kind of said reproducing lights and a magnetic Kerr effect of said magneto-optical recording disk is enhanced with respect to the other kind of said reproducing lights, each of refractive indexes and thicknesses of said first transparent dielectric film, said second transparent dielectric film, and said recording film with said perpendicular magnetic anisotropy being prescribed as a function of said predetermined wavelengths.

8. A method of reproducing signals recorded on a magneto-optical recording disk, said magneto-optical recording disk being claimed in claim 7, comprising the steps of:
inputting a circularly or elliptically polarized light on said magneto-optical recording disk as said one kind of said reproducing lights; and
detecting an intensity change of said light caused by said magneto-optical recording disk due to said circular dichroism effect thereof as a reproduced data.

9. A method according to claim 8, wherein said method is performed by any one of a ROM type optical recording disk reproducing apparatus and a WORM type optical recording disk reproducing apparatus.

10. A method of reproducing signals recorded on a magneto-optical recording disk, said magneto-optical recording disk being claimed in claim 7, comprising the steps of:
inputting a linearly polarized light on said magneto-optical recording disk as said one kind of said reproducing lights; and
detecting a rotation change of a polarization plane of said light caused by said magneto-optical recording disk due to said magnetic Kerr effect as a reproduced signal.

* * * * *